United States Patent
Zimmer

(10) Patent No.: US 6,772,470 B2
(45) Date of Patent: Aug. 10, 2004

(54) FOUR BAR WIPER-ARM

(75) Inventor: Joachim Zimmer, Sasbach (DE)

(73) Assignee: Robert Bosch GmbH, Stuttgart (DE)

(*) Notice: Subject to any disclaimer, the term of this patent is extended or adjusted under 35 U.S.C. 154(b) by 214 days.

(21) Appl. No.: 10/048,426

(22) PCT Filed: Mar. 4, 2001

(86) PCT No.: PCT/DE01/01282

§ 371 (c)(1),
(2), (4) Date: Jun. 26, 2002

(87) PCT Pub. No.: WO01/92072

PCT Pub. Date: Dec. 6, 2001

(65) Prior Publication Data

US 2002/0170135 A1 Nov. 21, 2002

(30) Foreign Application Priority Data

May 30, 2000 (DE) .......................................... 100 26 819

(51) Int. Cl.⁷ ................................................ B60S 1/06
(52) U.S. Cl. ................ 15/250.21; 15/250.23; 15/250.3; 15/250.31; 15/250.34
(58) Field of Search ........................ 15/250.21, 250.23, 15/250.3, 250.31, 250.34

(56) References Cited

U.S. PATENT DOCUMENTS 3,085,821 A    4/1963  Ryck
5,884,357 A  * 3/1999  Schill et al. .............. 15/250.21

FOREIGN PATENT DOCUMENTS

| DE | 16 30 196 | 4/1971 |
|---|---|---|
| DE | 36 21 233 | 1/1988 |
| DE | 39 00 525 | 7/1989 |
| DE | 44 28 371 | 2/1996 |
| EP | 0 806 330 | 11/1997 |
| FR | 2 772 326 | 6/1999 |
| JP | 07 186890 | 7/1995 |

OTHER PUBLICATIONS

Patent Abstracts of Japan, vol. 1995, No. 10 (Nov. 30, 1995).

* cited by examiner

Primary Examiner—Deborah Jones
Assistant Examiner—Abraham Bahta
(74) Attorney, Agent, or Firm—Kenyon & Kenyon

(57) ABSTRACT

A four-jointed wiper arm assembly includes a drive lever, which is connected to a driveshaft so that they rotate together and is coupled via a coupling element to a link rod which is pivotably mounted in a bearing on a vehicle body. The drive lever encloses an angle of approximately 90° with the coupling element in a parking position of the windshield wiper and is adjustable about an adjustment axis which extends approximately parallel to the coupling element and intersects the longitudinal axis of the driveshaft, and the coupling element is connected to the link rod via a ball joint.

21 Claims, 6 Drawing Sheets

FOUR BAR WIPER-ARM

FIELD OF THE INVENTION

The present invention relates to a four-jointed wiper arm assembly.

BACKGROUND INFORMATION

Wiper systems for motor vehicles having multiple windshield wipers are attached to the vehicle body using their wiper bearings directly or indirectly via a plate. A wiper motor with a built-in gearing drives, via a crank and joint rods, further cranks which are rigidly connected to a driveshaft for each windshield wiper.

Furthermore, it is possible that the output shaft of the wiper motor drives a four-jointed wiper arm assembly. This wiper arm assembly has a pivotable drive lever which sits on a drive axis and is flexibly connected to a link rod via a coupling element. The other end of the link rod sits on a fixed axis. Since the link rods are long, they require a relatively large amount of installation space. A fixing part of a wiper arm, to which a joint part of the wiper arm is fixed via a swing-down joint, is molded onto the coupling element. The drive lever can be driven directly by an output shaft of the wiper motor or via a crank and joint rods. The kinematics of the four-jointed wiper arm assembly causes a combined stroke-pivot movement of the windshield wiper. In this manner, the windshield wiper, the driveshaft of which is positioned more toward the center of the windshield, can follow the angular contour of a windshield better when the windshield wipers are synchronized, and this device is therefore frequently used in wiper systems to increase the field of view and comfort on the passenger side.

The wiping range of a windshield wiper is delimited by a parking position and a return position. The windshield wiper moves out from the parking position, which frequently is in the lower location in a hood gap between the engine hood and the windshield, upward to the return position and then back again.

The windshield wiper has a wiper arm, including the fixing part and a joint part coupled to it, onto which a wiper rod is coupled or molded. The free end of the wiper rod is flexibly connected to a wiper blade, a wiper strip of which with its wiper lip is moved over the windshield between the parking position and the return position during the pivot movement.

A wiper blade for cleaning curved windshields of motor vehicles is described in German Published Patent Application No. 36 21 233. In order to achieve good wiping results on a flat windshield, the wiper blade of a windshield wiper must be positioned so that its longitudinal central plane is perpendicular to the windshield when the wiper blade is unloaded, and a wiper lip molded on the wiper strip only touches the windshield surface. In spherically curved vehicle windshields, the slope of this longitudinal central plane to the windshield surface changes over the entire wiped area. Furthermore, the slope of the longitudinal central plane also changes in the longitudinal direction of the wiper blade. The optimum alignment described for a flat windshield can only be achieved during the wiper operation for spherically curved vehicle windshields at certain points and traveling in the longitudinal direction of the wiper blade. In this case, the deviations from the perpendiculars or the normals to the vehicle windshield, which are measured in angular degrees and are called perpendicular deviations or perpendicular errors, are greater in the more strongly curved side regions of the vehicle windshield than in the flat central regions. The flexibility of the wiper squeegee can only partially compensate for the perpendicular deviation.

In practice, the necessary setting angle of the wiper blade relative to the windshield and thus the perpendicular error is usually produced by slanting the output axes of the wiper linkage. The wiper blade therefore assumes a desired position which deviates from a perpendicular position relative to the vehicle windshield. Since wiper systems are characterized by a large length/width ratio, a great sensitivity of the angular position of the output axes and thus of the perpendicular error of the wiper blade results, particularly in the parking position. The manufacturing tolerances of the individual, numerous components of the windshield wiper and its drive are low, however, the sum of the tolerances, combined with those of the attachment to the vehicle body and of the body itself, is so large that an optimum setting angle is not ensured in mass production. To compensate for the manufacturing tolerances, the longitudinal central plane of the windshield wiper to the vehicle windshield is therefore set during assembly by setting the wiper arm so that the desired perpendicular error is achieved. The setting in the parking position, which is to allow the greatest possible bandwidth in regard to the setting angle, must not, however, lead to significant deviations in the return position of the windshield wiper.

A shaft-hub connection of a windshield wiper in which, in the connection region, the driveshaft has an offset and a cross-section which deviates from the circular, and is in particular polygonal, is described in German Published Patent Application No. 44 28 371. An edge of a recess of the fixing part presses against the offset or an intermediate disk, with the recess conically expanding toward the end of the driveshaft. A matching, conical clamping part, which is pressed by a nut against the fixing part, is inserted into the recess. The clamping part has a passage for the driveshaft, the cross-sectional profile of which corresponds to that of the driveshaft.

A similar shaft-hub connection of a windshield wiper is described in U.S. Pat. No. 3,085,821. The clamping part has a passage for the driveshaft which fits with a cylindrical or conical region of the driveshaft having a knurl and/or a toothed surface. Through the conical connection between the fixing part and the clamping part and, if necessary, through the conical connection between the clamping part and the driveshaft, the toothed surface of the fixing part and of the driveshaft is pressed into the surface of the clamping part, which was as smooth as possible up to this point, and permanently deforms it. For this purpose, the clamping part is made of an elastomer material or a relatively soft non-ferrous metal. In addition to the adhesion, a supporting positive connection is achieved by the many small lateral surfaces of the teeth.

SUMMARY

According to an example embodiment of the present invention, in a parking position of the windshield wiper, the drive lever of a four-jointed wiper arm assembly encloses an angle $\alpha$ of approximately 90° with the coupling element and is adjustable about an adjustment axis which extends approximately parallel to the coupling element and intersects the longitudinal axis of the driveshaft. The coupling element is connected to a link rod via a ball joint. Furthermore, a fixing part, on which a joint part with a wiper rod is coupled via a swing-down joint, of a wiper arm is attached or molded onto the coupling element. A wiper blade is flexibly connected to this wiper rod.

As the drive lever pivots about the adjustment axis, the coupling element is rotated around its longitudinal axis with the fixing part and the desired perpendicular error of the wiper blade is thus set. Setting may be easily performed in the parking position of the windshield wiper. The adjustment range may be +/−3°. This is achieved in addition to the slanting of the two main axes of the drive lever.

The desired perpendicular error of the wiper blade may be freely selected during assembly of the windshield wiper, so that manufacturing tolerances do not negatively influence it. If the drive lever is rotated about the adjustment axis, the height of the coupling element changes. To prevent the four-jointed wiper arm assembly from being tensioned and the movement cycle from being blocked by this, it is possible for the coupling element to include two parts, with the first coupling part being coupled to the drive lever and being connected via a rotary joint, the rotational axis of which extends transverse to the longitudinal direction of the coupling element, to a second coupling part. This second coupling part is connected via a ball joint to the link rod. In this manner, the height displacement may be compensated.

In another example embodiment of the present invention, the contact surface between the clamping part and the drive lever forms a part of the surface of a sphere, while the bearing surface between the drive lever and the offset of the driveshaft forms a part of a lateral surface of a cylinder, the cylinder axis of which extends through the center of the sphere and parallel to the longitudinal direction of the wiper blade. In this manner, the drive lever and therefore the wiper arm are continuously adjustable about its longitudinal axis in a small overall installation space, if the bearing surface is smooth. A stepped adjustment is possible if the bearing surface has ribbing parallel to the cylinder axis. The ribbing may be used as a setting raster. Furthermore, the adhesive connection is supported by a positive connection, so that large forces may be transmitted.

The connection between the driveshaft and the drive lever may be secure and able to transmit large torques. However, it may not react so sensitively to the tightening torque of the screw connection that the setting selected is unintentionally changed when the screw is tightened. According to an example embodiment of the present invention, the cylinder axis of the bearing surface of the drive lever may extend through the sphere center of the contact surface between the clamping part and the drive lever, with the cylinder axis being, for example, within the attachment region of the drive lever.

According to another example embodiment of the present invention, the adjustment angle $\ddot{a}_1$ or $\ddot{a}_2$ of the drive lever about the cylinder axis of the bearing surface may be delimited by a stop. In this manner, setting angles which are completely unusable are kept from being unintentionally mounted on the vehicle. The stops enclose the optimum setting angle, from which deviating settings which are not optimum, but are usable, are possible. The stops are easily produced by an oblong hole in the drive lever which extends transverse to the cylinder axis and acts together with the driveshaft.

The cylindrical bearing surface may be molded directly onto the driveshaft, but it may be molded in a separate supporting plate which is supported on an offset of the driveshaft after assembly. The supporting plate is rotatably guided on the driveshaft, so that the longitudinal direction of the drive lever and therefore the longitudinal direction of the wiper arm may be rotated and aligned about the driveshaft axis, before the torque connection is produced by the clamping part and the screw. Simultaneously, the drive lever may be rotated about the adjustment axis between the two stops in order to set the setting angle of the wiper blade to the vehicle windshield.

The torque may be transmitted from the driveshaft via a noncircular profile, for example, one with a polygonal cross-section, to the clamping part, which transmits it predominantly through adhesion to the drive lever via the spherical contact surface. In this manner, the torque is transmitted on a small circumference by a secure positive connection, while the adhesion is provided on a larger diameter, and thus larger torques may be transmitted by smaller pressures. The adhesion may be supported by a positive connection in that the spherical surface of the drive lever is roughened or ribbed. In this case, the ribbing on the clamping part may extend at an angle to the ribbing on the drive lever, so that the directions intersect and a positive connection results which acts both in the direction of the torque to be transmitted and in the direction of the adjustment forces, with the ribbings being able to dig into one another. Manufacturing tolerances may also be compensated by the deformability of the ribbing.

According to another example embodiment of the present invention, the clamping part has grooves extending longitudinally on its circumference which end just before the larger end face. The grooves allow the clamping part to deform elastically and thus to adapt better to the depression of the drive lever. Since the grooves are not cut through up to the end face of the clamping part, but end just before it, a smooth end face is maintained. Furthermore, the grooves are protected toward the outside.

Before final assembly, some parts of the connection may be preassembled. For this purpose, on one hand, a locking ring made of plastic is used which rotatably attaches the supporting plate to the driveshaft and, on the other hand, in another example embodiment of the present invention, a plastic clip is used which clamps the supporting plate to the drive lever so it may pivot about the cylinder axis. In this case, the drive lever may have a shoulder on which the plastic clip is held. Furthermore, the plastic clip is able to engage with projections in recesses of the drive lever.

DETAILED DESCRIPTION

Figure 1:
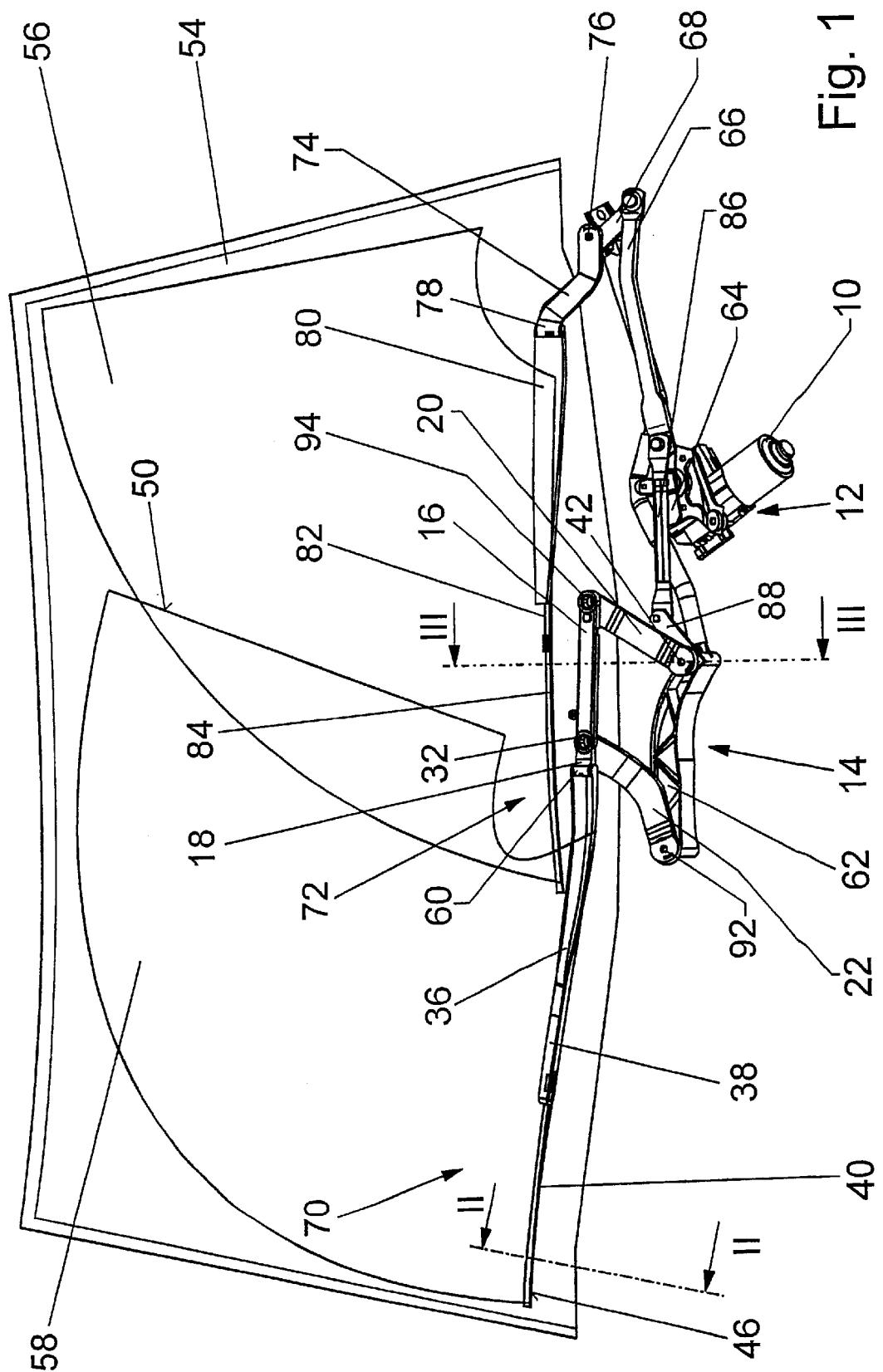
FIG. 1 is a perspective view of a wiper system in the parking position.

As illustrated in FIG. 1, the drive of a wiper system, including a wiper motor 10 and a gearing 12 mounted on it, drives two windshield wipers 70 and/or 72 via a crank 64 and lever mechanisms. On the driver side, the lever mechanism includes a joint rod 66 flexibly connected to crank 64, which is in turn flexibly connected at its other end to a further crank 68 of a driveshaft 76. A fixing part 74 of windshield wiper 72 sits at the other end of the driveshaft. A joint part 80, which holds a wiper rod 82 with a wiper blade 84, adjoins fixing part 74 via a swing-down joint 78. During the pivot movement of fixing part 74, wiper blade 84 passes over a wiped area 56 on a vehicle windshield 54.

A wiped area 58 of windshield wiper 70 on the passenger side is different from that on the driver side in that the outer end of the windshield wiper passes over a relatively large area in the upper corner of vehicle windshield 54. In order to obtain wiped area 58, windshield wiper 70 may perform a stroke-pivot movement, which is produced by a four-jointed wiper arm assembly 14. This includes a drive lever 20, a link rod 22, and a coupling element 16 having a molded-on fixing part 18.

Drive lever 20 sits on a driveshaft 90 which is mounted in a bearing 42 on a plate 62. This plate 62 is affixed to a vehicle body. Driveshaft 90 is driven by a crank 88. A joint rod 86 connects crank 88 to crank 64 on gearing 12. A link rod 22 is pivotably mounted in a bearing 92 of plate 62 and is connected via a ball joint 32 to coupling element 16, which is connected in turn via a joint 94 to drive lever 20.

An extension of coupling element 16 on the other side of joint 32 forms a fixing part 18 of windshield wiper 70, which joint part 36 adjoins with a swing-down joint 60 and with wiper rod 38 and wiper blade 40. During a wiping cycle, windshield wiper 70 moves out of a parking position 46 in the direction of the driver side up to a return position 50.

Figure 2:
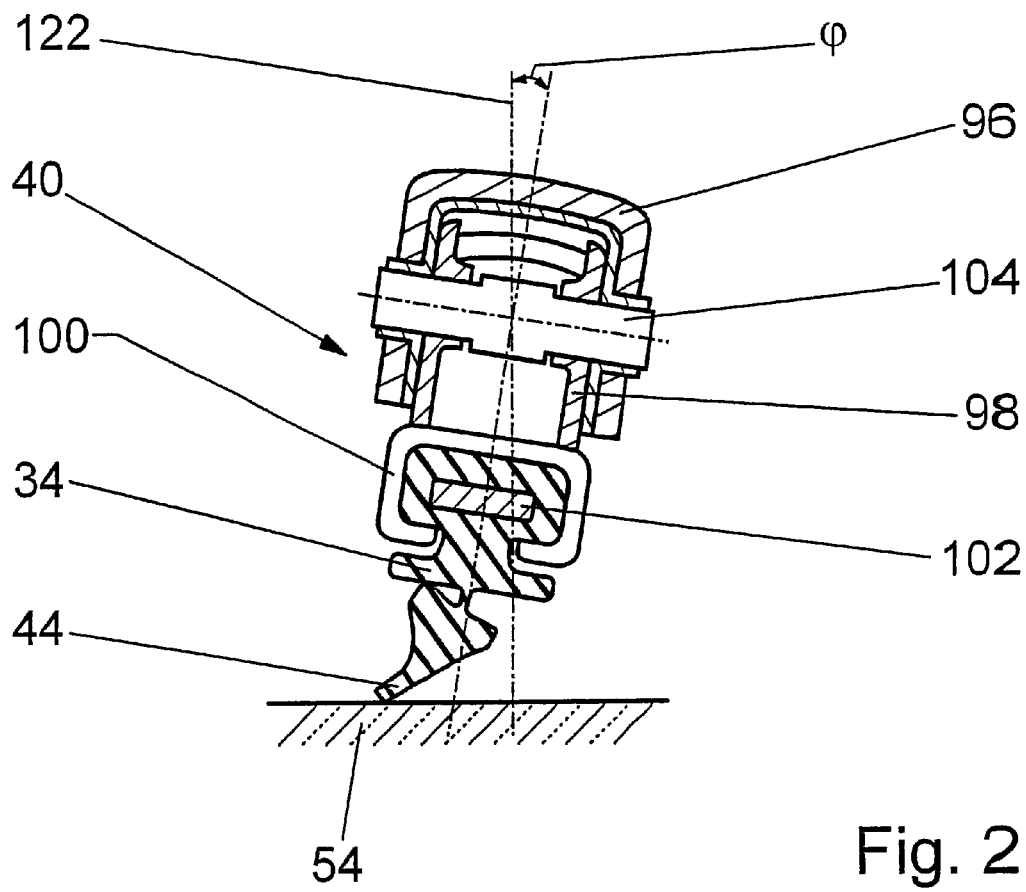
FIG. 2 is an enlarged cross-sectional view through a wiper blade taken along the line II—II illustrated in FIG. 1.

As illustrated in FIG. 2, wiper blade 40 includes an upper clip 96 and a claw clip 98, which are flexibly connected to one another via a joint pin 104. A wiper squeegee 34 is held by multiple claws 100 of claw clip 98. A spring strip 102, which uniformly distributes the pressure of wiper blade 40 on a wiper lip 44 molded on wiper squeegee 34, is located on the profiled back of wiper squeegee 34.

Wiper blade 40 encloses an angle $\phi$ with a normal 122 to the vehicle windshield 34 in the parking position. This angle $\phi$, which is also called the perpendicular error, has a desired value which may deviate from its setpoint value due to manufacturing tolerances.

Figure 3:
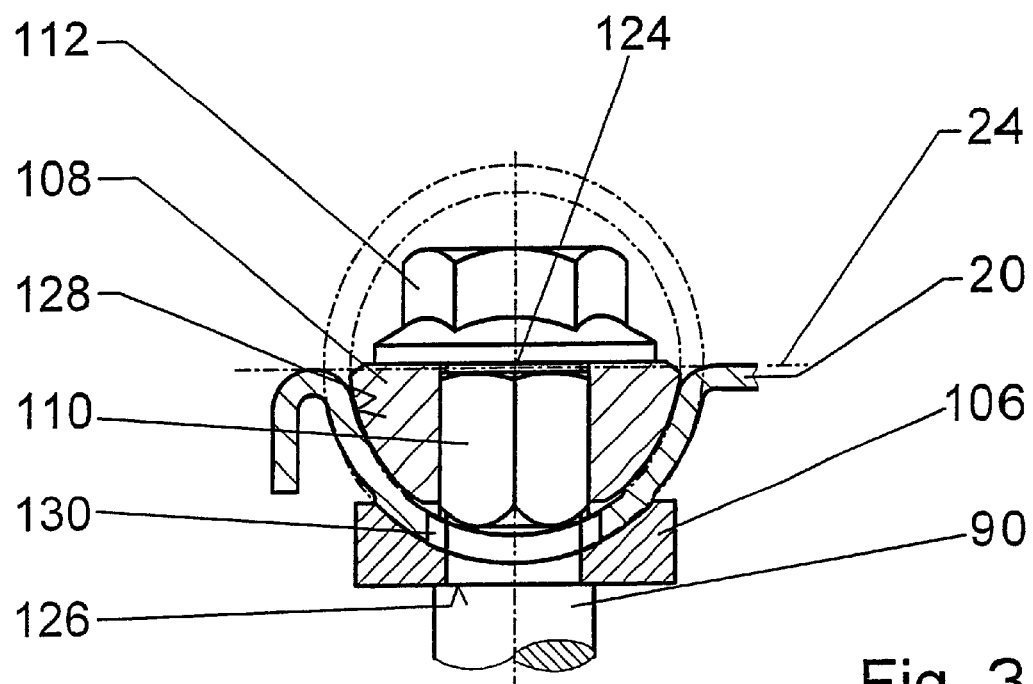
FIG. 3 is an enlarged cross-sectional view through a wiper bearing according to an example embodiment of the present invention taken along the line III—III illustrated in FIG. 1.
Figure 5:
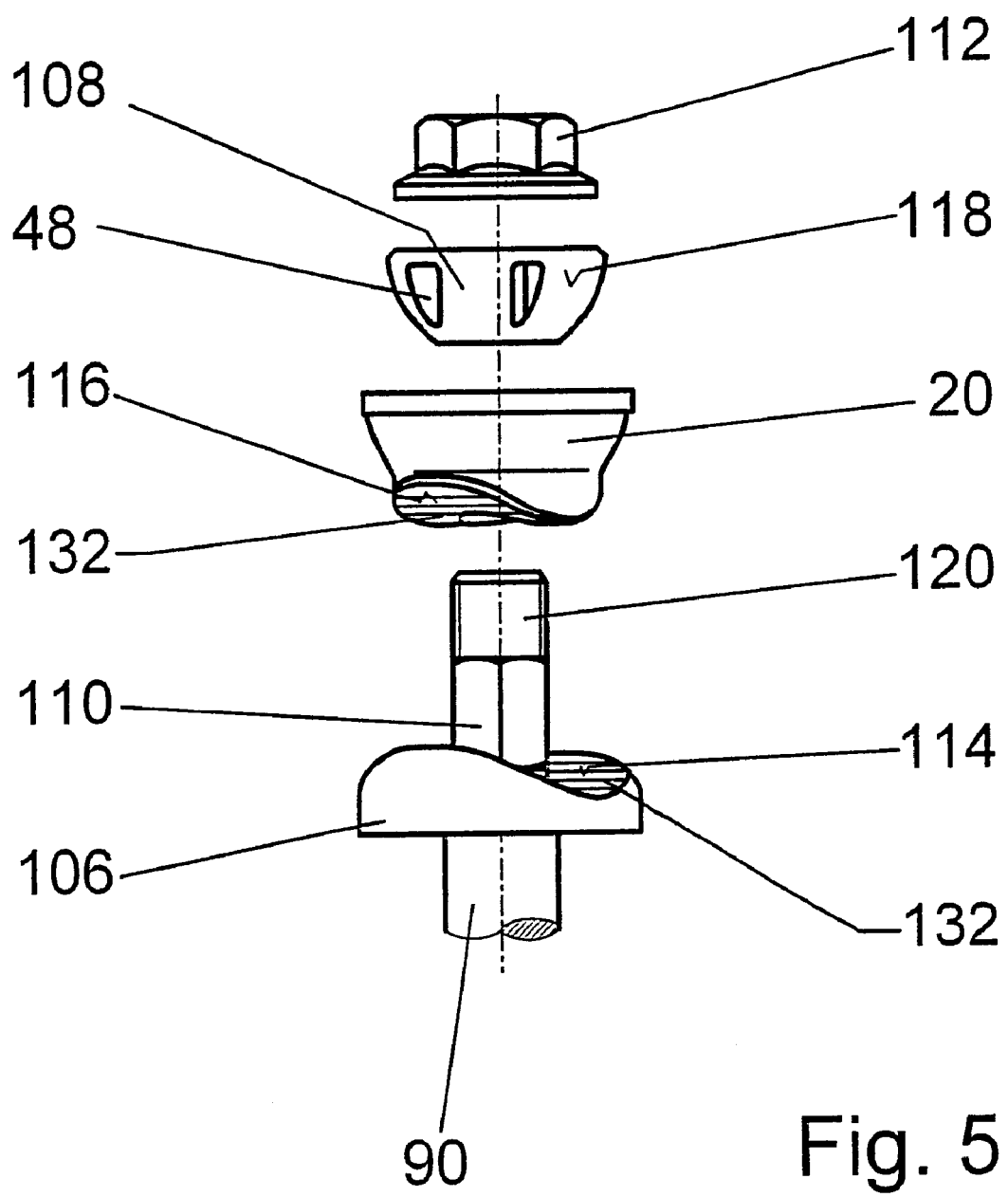
FIG. 5 is an exploded view illustrating a drive lever with a driveshaft.

In order to reach the setpoint value again, wiper blade 40 is set in parking position 46 during assembly of windshield wiper 70, in that drive lever 20 is rotated about its adjustment axis 24. For this purpose, drive lever 20 supports itself via a cylindrical bearing surface 116 on a corresponding cylindrical bearing surface 114 on driveshaft 90. As illustrated in FIG. 3 and FIG. 5, a supporting plate 106, which supports itself on an offset 126, but is rotatably guided around driveshaft 90, may be threaded on the free end of driveshaft 90. Cylindrical bearing surface 114 is incorporated toward drive lever 20 in supporting plate 106. The common axis of bearing surfaces 114, 116 is simultaneously adjustment axis 24.

In addition, drive lever 20 has a depression 128 into which a clamping part 108 is inserted. A nut 112, which engages in thread 120, clamps clamping part 108, drive lever 20, and supporting plate 106 with offset 126 of driveshaft 90. Drive lever 20 may be molded from sheet metal, with depression 128 being deep drawn.

Cylindrical surface 116 on drive lever 20 is aligned so that adjustment axis 24 extends approximately parallel to the longitudinal axis of coupling element 16 in parking position 46. Furthermore, contact surfaces 118, 128 between clamping part 108 and drive lever 20 form a part of the surface of a sphere, with adjustment axis 24, e.g., extending through sphere center 124. Therefore, no positioning torques occur during the clamping of drive lever 20 by a nut 112, by which the setting may be unintentionally changed again. In order to delimit the adjustment range, hole 130 on drive lever 20 is configured to be oblong in the setting direction, so that it forms a stop on both sides of driveshaft 90. Cylindrical surfaces 114, 116 may have a ribbing 132 extending parallel to adjustment axis 24, which forms a raster scale for the setting and, in addition, secures the setting performed.

Clamping part 108 has an inner driver profile 110 which fits with the outer profile of driveshaft 90 and transmits the drive torque positively from driveshaft 90 to clamping part 108. The profile may have a cross-section which is noncircular, e.g., polygonal. Through the positive connection between clamping part 108 and driveshaft 90, large torques may be reliably transmitted on a small diameter. The significantly larger diameter of the outer circumference of clamping part 108 is better suited to transmit the drive torque by adhesion to drive lever 20. In order that clamping part 108 may fit better elastically with the depression of drive lever 20, it has grooves 48 extending longitudinally.

Figure 4:
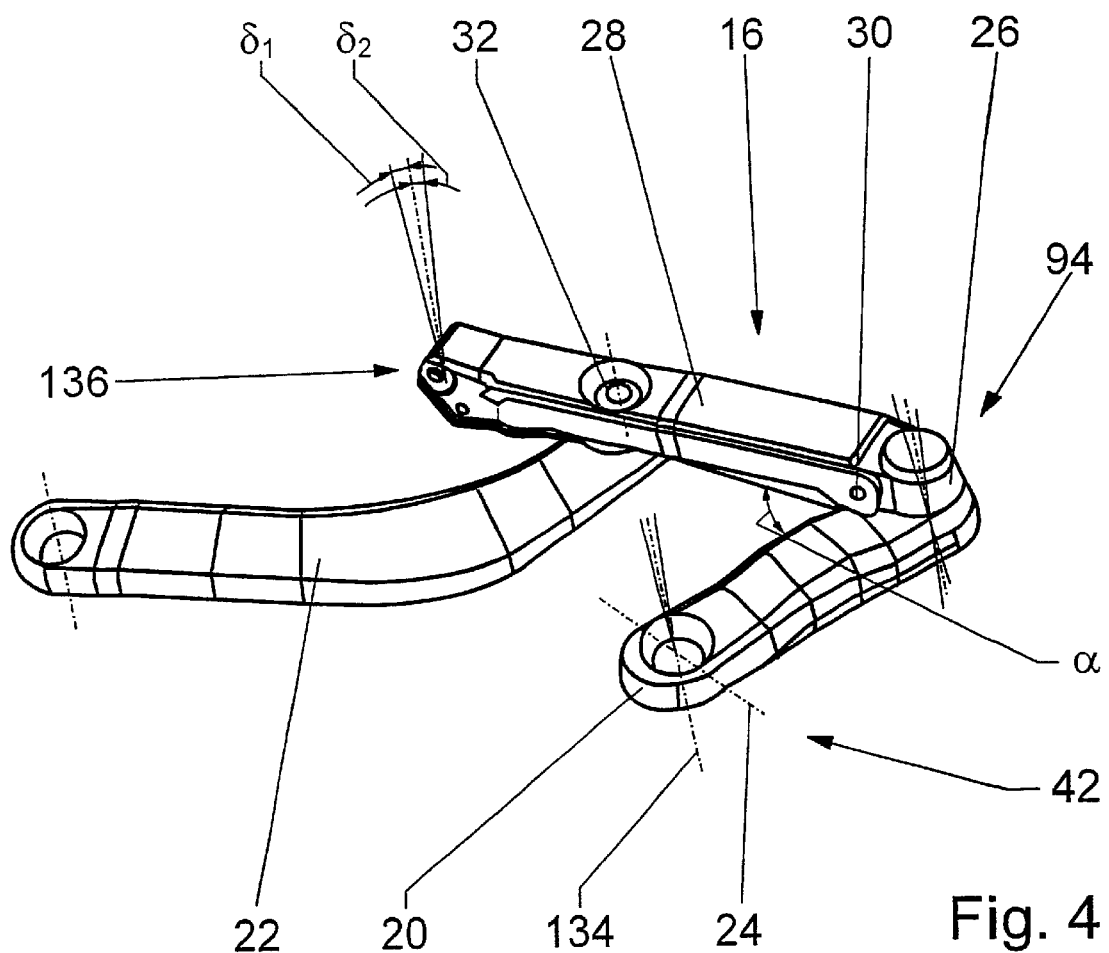
FIG. 4 is an enlarged perspective view of a four-jointed wiper arm assembly.

According to another example embodiment of the present invention, as illustrated in FIG. 4, drive lever 20 encloses an angle $\alpha$ of approximately 90° with coupling element 16 in parking position 46 of windshield wiper 70. If drive lever 20 is now pivoted by a specific angle on bearing 42 from a starting position 134, this pivoting is transmitted to coupling part 116 and a receiver bore 136 for fixing part 18 has an adjustment angle range of $\delta_1$ or $\delta_2$ from a starting position 134.

When drive lever 20 is pivoted about adjustment axis 24, its height position on joint 94 changes simultaneously. In order to compensate for a difference in height to fixed link rod 22 which then occurs, coupling element 16 has a first coupling part 26 which is connected on joint 94 to drive lever 20 and is connected via a rotary joint 30 to a second coupling part 28. Second coupling part 28 is connected via a ball joint 32 to link rod 22. The movement of four-jointed wiping lever 14 is thus able to occur without constraint.

Figure 6:
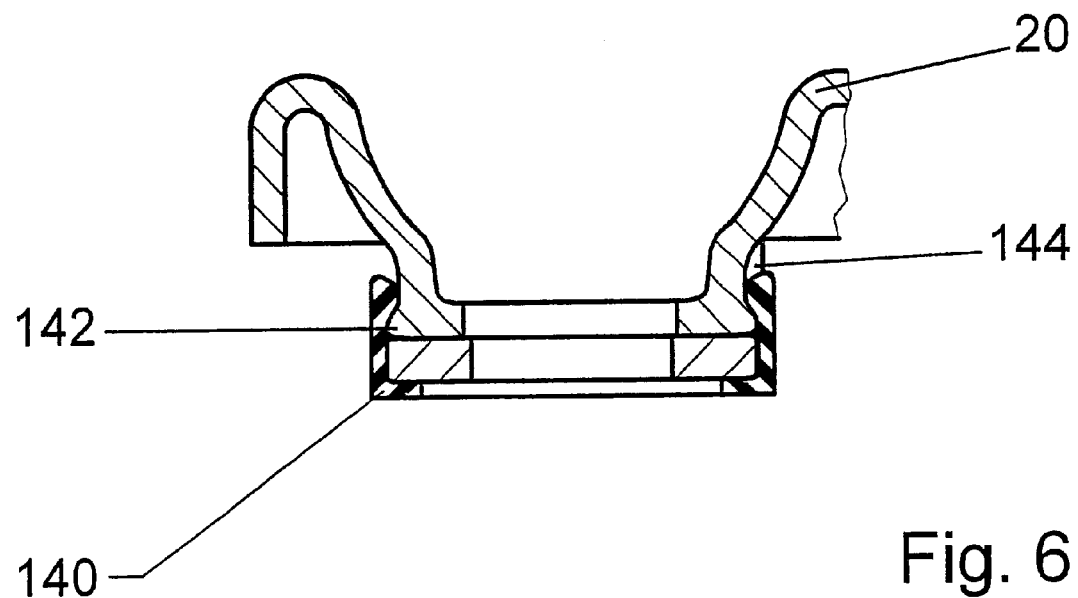
FIG. 6 is an enlarged partial longitudinal sectional view through a drive lever in the connection region to a driveshaft.
Figure 7:
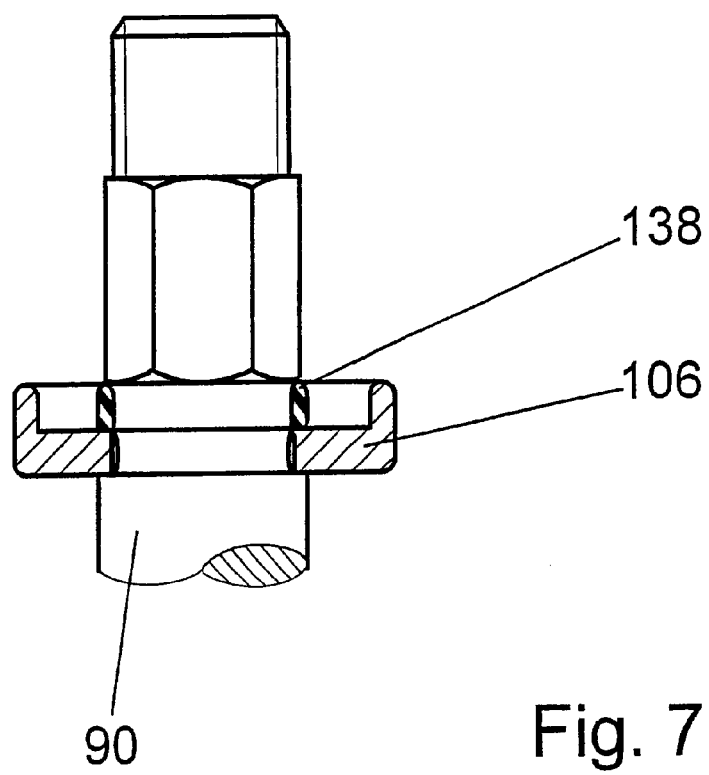
FIG. 7 is an enlarged sectional view of an assembled supporting plate.

The assembly of drive lever 20 may be made easier if supporting plate 106 is connected to another component before assembly. As illustrated in FIG. 7, a locking ring 138 is used for this purpose, which holds supporting plate 106 on driveshaft 90. Another possibility is illustrated in FIG. 6, with the illustration in the left half showing a plastic clip 140 engaging behind a shoulder 142 of drive lever 20, or, as illustrated in the right side of the illustration, catching in a corresponding recess 144. Shoulder 142 and recess 144 may be positioned and configured so that they do not obstruct the adjustment of drive lever 20 about adjustment axis 24.

Figure 8:
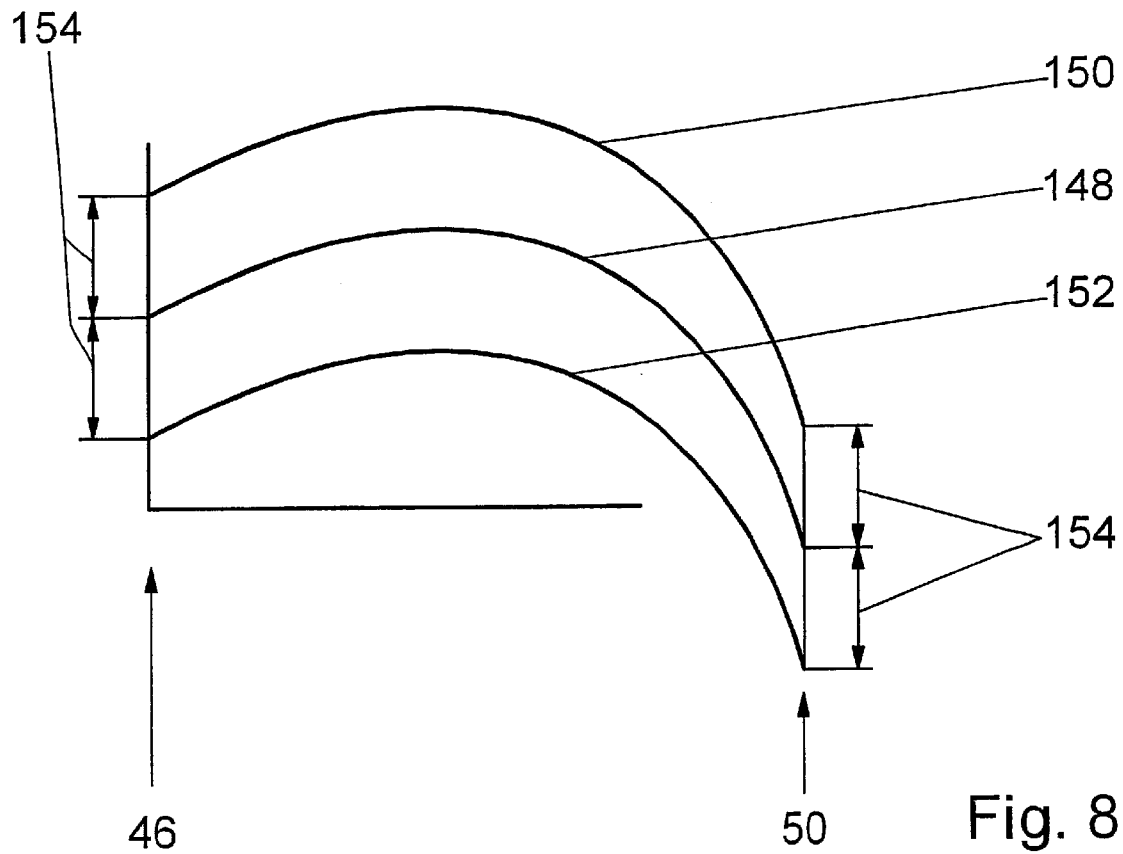
FIG. 8 is a graph illustrating the effect of resetting a wiper arm.
Figure 9:
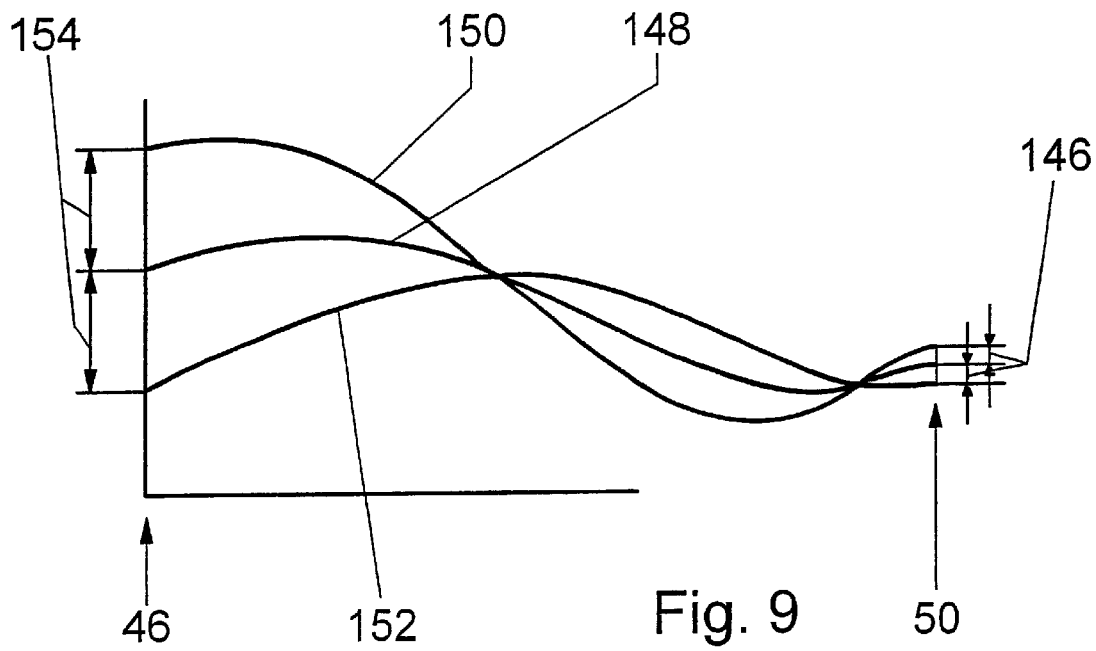
FIG. 9 is a graph illustrating the effect of setting a wiper arm in a four-jointed wiper arm assembly.

FIG. 8 is a graph illustrating that a deviation 154 from the perpendicular error present in parking position 46 remains unchanged relative to a curve 150, which represents a central starting position, over entire wiped area 56, 58 up to return position 50 for conventional windshield wipers set by setting the wiper arm. Curve 150 characterizes the maximum adjustment range in one direction, while curve 152 marks the maximum adjustment range in the opposite direction. In contrast, FIG. 9 illustrates corresponding curves 148, 150, 152 for four-jointed wiper arm assembly 14 according to another example embodiment of the present invention, which is set via its drive lever 20. In this case, a deviation 154 from the perpendicular error set in parking position 46 acts differently over entire wiped area 56, 58 and, e.g., in return position 50, illustrates a significantly smaller deviation 146. Therefore, perpendicular error $\phi$ may be adapted only in parking position 46.

What is claimed is:

1. A four-jointed wiper arm assembly, comprising:
    a link rod pivotably mounted in a bearing on a vehicle body;
    a coupling element connected to the link rod via a ball joint; and
    a drive lever connected to and configured to rotate together with a driveshaft, the drive lever coupled via the coupling element to the link rod, the drive lever enclosing an angle of approximately 90° with the coupling element in a parking position of a windshield wiper, the drive lever adjustable about an adjustment axis that extends approximately parallel to the coupling element and intersects a longitudinal axis of the driveshaft.

2. The wiper arm assembly according to claim 1, wherein the coupling element includes a first coupling part coupled on the drive lever and a second coupling part coupled on the link rod via the ball joint, the first coupling part and the second coupling part connected to one another via a rotary joint, and wherein a rotational axis of the rotary joint extends transverse to a longitudinal direction of the coupling element.

3. The wiper arm assembly according to claim 1, further comprising a fixing part molded onto an end of the coupling element on the link rod end, a joint part of the windshield wiper coupled to the fixing part.

4. The wiper arm assembly according to claim 1, wherein the driveshaft is inserted through an expanding depression of the drive lever and a nut clamps the drive lever against an offset of the driveshaft via a clamping part adapted to the depression, contact surfaces between the clamping part and the drive lever form a part of a surface of a sphere, the drive lever configured to support itself on the offset via cylindrical surfaces, an axis of the cylindrical surfaces including the adjustment axis and extending through a sphere center.

5. The wiper arm assembly according to claim 4, wherein the cylindrical surface is molded in a supporting plate configured to support itself on the offset of the driveshaft and rotatable about the driveshaft.

6. The wiper arm assembly according to claim 1, wherein an adjustment angle about the adjustment axis is delimited by a stop.

7. The wiper arm assembly according to claim 6, wherein the stop includes a hole in the drive lever, the hole oblong in an adjustment direction.

8. The wiper arm assembly according to claim 1, wherein the adjustment axis extends within an attachment region of the drive lever.

9. The wiper arm assembly according to claim 4, wherein the drive lever is molded from sheet metal and the depression is deep drawn.

10. The wiper arm assembly according to claim 4, wherein the clamping part is connected to the driveshaft via a driver profile that includes a noncircular cross-section.

11. The wiper arm assembly according to claim 10, wherein the driver profile includes a polygonal cross-section.

12. The wiper arm assembly according to claim 5, wherein the supporting plate is rotatably attached on the driveshaft by a locking ring made of plastic.

13. The wiper arm assembly according to claim 5, wherein the supporting plate is pivotably attached on the drive lever about the adjustment axis.

14. The wiper arm assembly according to claim 13, wherein the supporting plate is attached to the drive lever by a plastic clip.

15. The wiper arm assembly according to claim 14, wherein the drive lever includes a shoulder, the plastic clip held on the shoulder.

16. The wiper arm assembly according to claim 15, wherein the drive lever includes recesses, the plastic clip configured to catch in the recess.

17. The wiper arm assembly according to claim 4, wherein the cylindrical surfaces include ribbing that extend parallel to the adjustment axis.

18. The wiper arm assembly according to claim 4, wherein the drive lever and the clamping part are one of roughened and ribbed on the spherical surface so that ribbing of the drive lever intersects with ribbing of the clamping part.

19. The wiper arm assembly according to claim 4, wherein the clamping part includes grooves that extend longitudinally on its circumference.

20. The wiper arm assembly according to claim 19, wherein the grooves end just before a larger end face.

21. A method for setting a four-jointed wiper arm assembly, the wiper arm assembly including a link rod pivotably mounted in a bearing on a vehicle body, a coupling element connected to the link rod via a ball joint, and a drive lever connected to and configured to rotate together with a driveshaft, the drive lever coupled via the coupling element to the link rod, the drive lever enclosing an angle of approximately 90° with the coupling element in a parking position of a windshield wiper, the drive lever adjustable about an adjustment axis that extends approximately parallel to the coupling element and intersects a longitudinal axis of the driveshaft, comprising the step of:
    adjusting a perpendicular error only in a parking position.

* * * * *